(12) United States Patent
Kisara (10) Patent No.: US 11,574,410 B2
(45) Date of Patent: Feb. 7, 2023

(54) PERSON TRACKING SUPPORT DEVICE AND PERSON TRACKING SUPPORT SYSTEM

(71) Applicant: MITSUBISHI ELECTRIC BUILDING SOLUTIONS CORPORATION, Tokyo (JP)

(72) Inventor: Naohiro Kisara, Tokyo (JP)

(73) Assignee: MITSUBISHI ELECTRIC BUILDING SOLUTIONS CORPORATION, Tokyo (JP)

( * ) Notice: Subject to any disclaimer, the term of this patent is extended or adjusted under 35 U.S.C. 154(b) by 0 days.

(21) Appl. No.: 17/343,844

(22) Filed: Jun. 10, 2021

(65) Prior Publication Data

US 2021/0398298 A1 Dec. 23, 2021

(30) Foreign Application Priority Data

Jun. 18, 2020 (JP) .............................. JP2020-104980

(51) Int. Cl.
| | |
|---|---|
| G06T 7/292 | (2017.01) |
| G06T 7/246 | (2017.01) |
| G08B 5/22 | (2006.01) |
| H04N 7/18 | (2006.01) |
| G06V 20/52 | (2022.01) |
| G06V 40/16 | (2022.01) |

(52) U.S. Cl.
CPC .............. *G06T 7/292* (2017.01); *G06T 7/246* (2017.01); *G06V 20/52* (2022.01); *G06V 40/172* (2022.01); *G08B 5/22* (2013.01); *H04N 7/181* (2013.01); *G06T 2207/30201* (2013.01); *G06T 2207/30232* (2013.01)

(58) Field of Classification Search
None
See application file for complete search history.

(56) References Cited

U.S. PATENT DOCUMENTS

| | | | |
|---|---|---|---|
| 11,196,968 B1* | 12/2021 | Kerzner | H04N 7/181 |
| 11,227,496 B1* | 1/2022 | Madden | G08G 1/149 |
| 11,373,427 B1* | 6/2022 | Monk | G06V 40/10 |
| 11,393,108 B1* | 7/2022 | Modestine | G06F 3/04842 |

(Continued)

FOREIGN PATENT DOCUMENTS

| | | | | |
|---|---|---|---|---|
| JP | 2011-18094 A | | 1/2011 | |
| JP | 2011018094 A | * | 1/2011 | ........... G08B 13/196 |

(Continued)

*Primary Examiner* — Reza Aghevli
(74) *Attorney, Agent, or Firm* — Birch, Stewart, Kolasch & Birch, LLP (57) ABSTRACT

A person tracking support device includes a processor. The processor acquires identification information of a tracked person identified from a face image of a person imaged by a first camera, and a first time at which the tracked person is imaged by the first camera, and also acquires a second time at which the tracked person is imaged by a second camera positioned away from the first camera, predicts a time at which the tracked person reaches a specific area on the basis of an elapsed time from the first time to the second time and a distance from the first camera to the second camera, and notifies a mobile terminal device possessed by each of a plurality of observers of the identification information of the tracked person, the specific area, and the time predicted.

9 Claims, 7 Drawing Sheets

(56) References Cited

U.S. PATENT DOCUMENTS

| | | | |
|---|---|---|---|
| 2017/0046577 A1* | 2/2017 | Rocque | G06V 10/225 |
| 2018/0100748 A1 | 4/2018 | Waniguchi et al. | |
| 2018/0158192 A1* | 6/2018 | Rocque | A61B 5/0075 |
| 2019/0012546 A1* | 1/2019 | Kirenko | G06T 7/248 |
| 2019/0139258 A1* | 5/2019 | Slattery | G06F 3/14 |
| 2020/0202288 A1* | 6/2020 | Buibas | G06V 20/52 |
| 2020/0327315 A1* | 10/2020 | Mullins | H04N 7/181 |
| 2021/0357655 A1* | 11/2021 | Park | G06T 7/11 |
| 2021/0385379 A1* | 12/2021 | Smith | G06F 1/163 |
| 2022/0269800 A1* | 8/2022 | Cui | G06V 40/161 |

FOREIGN PATENT DOCUMENTS

| | | | | |
|---|---|---|---|---|
| JP | 2018-60481 A | | 4/2018 | |
| JP | 2019-9529 A | | 1/2019 | |
| JP | 2019-53483 A | | 4/2019 | |
| JP | 2019053483 A | * | 4/2019 | G08B 13/196 |

\* cited by examiner

| IDENTIFICATION CODE | FEATURE OF TRACKED PERSON ||| TRACKERS TO BE DEPLOYED |
|---|---|---|---|---|
| | GENDER | SUSPICION SUMMARY | SUSPICION DETAIL | |
| 6 | MALE | VIOLENT CRIME | MURDER, ROBBERY, HAVE WEAPON POSSESSION HISTORY | 10 TRACKERS (INCLUDING TWO OR MORE OBSERVERS HAVING CAREER OF MORE THAN 5 YEARS) |
| 5 | MALE | VIOLENT CRIME | INJURY, ASSAULT, ACT EQUIVALENT TO THEM | 8 TRACKERS (INCLUDING ONE OR MORE OBSERVERS HAVING CAREER OF MORE THAN 5 YEARS) |
| 4 | MALE | VIOLENT CRIME | OTHERS (INTIMIDATION AND THE LIKE) | 8 TRACKERS |
| 3 | MALE | INTELLECTUAL CRIME | — | 6 TRACKERS |
| 2 | FEMALE | VIOLENT CRIME | — | 8 TRACKERS (INCLUDING ONE OR MORE FEMALE OBSERVERS) |
| 1 | FEMALE | INTELLECTUAL CRIME | — | 6 TRACKERS (INCLUDING ONE OR MORE FEMALE OBSERVERS) |

PERSON TRACKING SUPPORT DEVICE AND PERSON TRACKING SUPPORT SYSTEM

CROSS REFERENCE TO RELATED APPLICATION

This application claims priority to Japanese Patent Application No. 2020-104980 filed on Jun. 18, 2020, which is incorporated herein by reference in its entirety including the specification, claims, drawings, and abstract.

TECHNICAL FIELD

The present disclosure relates to a person tracking support device and a person tracking support system that support tracking of a person in public facilities, commercial facilities, and the like.

BACKGROUND

In recent years, recognition ability of face recognition technology using a computer has greatly advanced, and with the face recognition technology, a wanted suspect (hereinafter referred to as a wanted criminal) or the like can be detected from a face of a person imaged by a surveillance camera at an airport, for example. Furthermore, a technology that supports dispatch of a police officer to an incident site, and a technology that supports tracking of a trespasser in a facility have also been devised.

In JP 2018-60481 A, a guidance system is disclosed that sends a request for going straight to an incident site (target point) to a site terminal possessed by a police officer, and displays map information including route information from a current position of the site terminal to the target point.

In JP 2019-53483 A, a trespasser tracking device is disclosed that estimates a destination of a trespasser who has trespassed on a site on the basis of position information of the trespasser and facility information in the site, calculates a trespassing route to the destination of the trespasser on the basis of the estimated destination and path information in the site, derives a siege route on the basis of the trespassing route and position information of a security guard, and displays a site map and the siege route on a mobile terminal of the security guard.

In JP 2019-9529 A, a face authentication device is disclosed that stores a list of face photographs of specific persons such as wanted criminals, and, when a face photograph of a specific person in the list is detected from an image acquired by a surveillance camera, notifies a predetermined terminal device of a warning including information of the face photograph.

SUMMARY

Incidentally, it is possible to identify a tracked person such as a wanted criminal from a face image of a person imaged by each of cameras arranged in various places in a facility. However, sufficient study has not conventionally been performed on a technology for supporting tracking of a tracked person by linking information on the tracked person identified by each of a plurality of cameras.

An object of the present disclosure is to make it possible to support tracking of a tracked person by using information on a tracked person identified by each of a plurality of cameras.

A person tracking support device of the present disclosure includes a processor, in which the processor acquires identification information of a tracked person identified from a face image of a person imaged by a first camera, and a first time at which the tracked person is imaged by the first camera, and also acquires a second time at which the tracked person is imaged by a second camera positioned away from the first camera, predicts a time at which the tracked person reaches a specific area on a route positioned on the second camera's side with respect to the first camera on the basis of an elapsed time from the first time to the second time and a distance from the first camera to the second camera, and notifies a mobile terminal device possessed by each of a plurality of observers of the identification information of the tracked person, the specific area, and the time predicted.

According to this configuration, the observers can perform an action of arriving at the specific area before an arrival time of the tracked person by the information of which the mobile terminal device is notified, and suppress losing sight of the tracked person.

In the person tracking support device of the present disclosure, the processor may further acquire a third time at which the tracked person is imaged by a third camera positioned between the second camera and the specific area, update the time predicted on the basis of an elapsed time from the second time to the third time and a distance from the second camera to the third camera, and notify the mobile terminal device of the time updated.

According to this configuration, it is possible to improve accuracy of a predicted time at which the tracked person reaches the specific area even in a case where a moving speed of the tracked person changes. For example, in a case where the tracked person stops or makes a detour in a section between the first camera and the second camera, the predicted time is excessively delayed, or in a case where the tracked person rides on a horizontal or staircase escalator and the like in the section between the first camera and the second camera and the predicted time is excessively advanced, the predicted time is updated, so the accuracy can be improved.

In the person tracking support device of the present disclosure, there may be two or more of the specific areas, and the processor may identify a predicted ratio at which the tracked person advances to each of the plurality of specific areas on the basis of information on a current or past flow of people to each of the specific areas, set a tracker to be deployed in each of the plurality of specific areas from among the observers on the basis of the predicted ratio, and notify the mobile terminal device of each tracker of a deployment command to the specific area set for each tracker.

According to this configuration, an appropriate tracker can be deployed in each of the plurality of specific areas to which the tracked person may advance, and each tracker can perform an action of arriving at each specific area before the arrival time of the tracked person, and suppress losing sight of the tracked person.

In the person tracking support device of the present disclosure, the processor may set the tracker such that the number of the trackers deployed in another specific area having a higher predicted ratio than a certain predicted ratio is greater than that of the specific area in which the predicted ratio is the certain predicted ratio.

According to this configuration, it is possible to increase the deployment in the specific area to which the tracked person is highly likely to advance, and it is possible to reduce a possibility of losing sight of the tracked person.

In the person tracking support device of the present disclosure, the processor may acquire a type of suspicion of the tracked person, and in a case where the tracked person is identified as a violent criminal from the type of suspicion, set the tracker such that the number of the trackers deployed in at least one of the specific area or the other specific area is greater than that in a case where the tracked person is identified as an intellectual criminal from the type of suspicion.

According to this configuration, it is possible to predict resistance of the tracked person to the tracker and suppress insufficient or excessive deployment of the tracker.

In the person tracking support device of the present disclosure, the processor may acquire feature information of the tracked person, and set a tracker to be deployed in the specific area from among the observers on the basis of the feature information, and notify the mobile terminal device of the tracker of a deployment command to the specific area.

According to this configuration, an appropriate tracker for the tracked person can be deployed in the specific area.

In the person tracking support device of the present disclosure, the feature information may include a type of suspicion of the tracked person, and the processor, in a case where the tracked person is identified as a violent criminal from the type of suspicion, may set the tracker such that the number of the trackers to be deployed in the specific area is greater than that in a case where the tracked person is identified as an intellectual criminal from the type of suspicion.

According to this configuration, it is possible to predict resistance of the tracked person to the tracker and suppress insufficient or excessive deployment of the tracker.

In the person tracking support device of the present disclosure, the feature information may include a type of suspicion of the tracked person, and the processor, in a case where the tracked person is identified as a violent criminal from the type of suspicion, may set the tracker such that a greater number of the observers having a specific career are deployed in the specific area than that in a case where the tracked person is identified as an intellectual criminal from the type of suspicion.

According to this configuration, in a case where the tracked person is a violent criminal, failure to capture the tracked person can be suppressed.

A person tracking support system of the present disclosure includes: an authentication device that identifies a tracked person from a face image of a person imaged by a first camera and acquires identification information of the tracked person and a first time at which the tracked person is imaged by the first camera, and also identifies the tracked person from a face image of a person imaged by a second camera positioned away from the first camera and acquires a second time at which the tracked person is imaged by the second camera; a person tracking support device that acquires the identification information of the tracked person, the first time, and the second time from the authentication device; and a mobile terminal device communicably connected to the person tracking support device and possessed by each of a plurality of observers, in which the person tracking support device includes a processor, and the processor predicts a time at which the tracked person reaches a specific area on a route positioned on the second camera's side with respect to the first camera on the basis of an elapsed time from the first time to the second time and a distance from the first camera to the second camera, and notifies each mobile terminal device of the identification information of the tracked person, the specific area, and the time predicted.

According to this configuration, the observers can perform an action of arriving at the specific area before an arrival time of the tracked person by the information of which the mobile terminal device is notified, and suppress losing sight of the tracked person.

According to the present disclosure, it is possible to support the tracking of the tracked person by linking the information on the tracked person identified by each of the plurality of cameras.

DESCRIPTION OF EMBODIMENTS

Hereinafter, embodiments according to the present disclosure will be described in detail with reference to the accompanying drawings. Configurations described below are examples for explanation, and can be appropriately changed according to specifications and the like of systems and devices. Furthermore, when a plurality of embodiments and modifications are included in the following, it is assumed from the beginning that those characteristic portions are appropriately combined and used. The same elements are designated by the same reference numerals in all drawings, and repeated description will be omitted.

Figure 1:
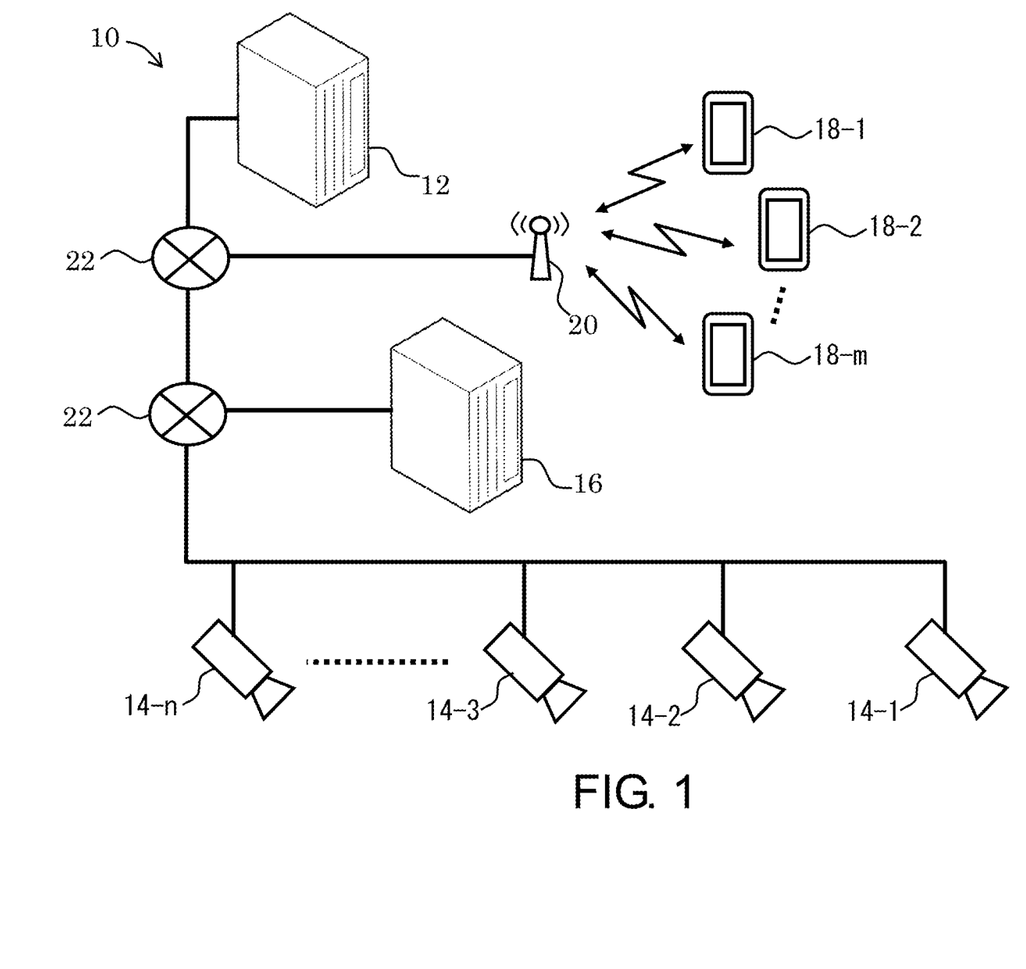
FIG. 1 is a diagram schematically illustrating an overall configuration of a person tracking support system.

FIG. 1 is a diagram schematically illustrating an overall configuration of a person tracking support system 10 according to a present embodiment. The person tracking support system 10 is a system that supports tracking of a tracked person such as a wanted criminal who appears in public facilities, commercial facilities, and the like. Examples of public facilities include airports, train stations, bus terminals, passenger ship terminals, and the like, and examples of commercial facilities include shopping malls, home centers, amusement parks, and the like, but are not limited to these. In the following, an example will be described in which the person tracking support system 10 is applied to an airport. The tracked person is not limited to domestic and foreign wanted criminals, but may be any person who needs to be tracked and captured.

The person tracking support system 10 includes a plurality of cameras 14-1 to 14-n (n is a positive integer) installed in a facility, an authentication device 16, a person tracking support device 12, and mobile terminal devices 18-1 to 18-m (m is a positive integer) respectively possessed by observers in the facility, and they are communicably connected together via a network 22 such as a Local Area Network (LAN). The plurality of mobile terminal devices 18-1 to 18-m are connected to the network 22 by wirelessly connecting to an access point 20. Note that, an observer is a watchman, a security guard, a police officer, or the like who can be a tracker who tracks the tracked person. Hereinafter, in a case where it is not necessary to distinguish each of the cameras 14-1 to 14-*n*, it is referred to as a camera 14, and in a case where it is not necessary to distinguish each of the mobile terminal devices 18-1 to 18-*m*, it is referred to as a mobile terminal device 18.

The camera 14 is an imaging device such as a surveillance camera having an imaging function and a communication function, and is installed on a wall, ceiling, or the like of the facility to image a predetermined area. The camera 14 transmits a captured image to the authentication device 16 via the network 22.

The authentication device 16 is a computer that performs face authentication. The authentication device 16 receives the captured image from each camera 14 and identifies the tracked person by collating a face image of a person appearing in each captured image with a face image in a list of tracked persons. Note that, in the list of tracked persons, identification information such as a face image and name is recorded in association with feature information such as gender, nationality, criminal suspicion, and weapon possession history for each tracked person. The authentication device 16 transmits the identification information and feature information of the tracked person identified from the captured image by the camera 14 and a time at which the identified tracked person is imaged by each camera 14 to the person tracking support device 12 via the network 22.

The person tracking support device 12 is a computer that provides the mobile terminal device 18 of each observer with information for tracking and capturing the tracked person. The person tracking support device 12 receives the identification information and feature information of the tracked person from the authentication device 16 and transfers them to each mobile terminal device 18 via the network 22. Furthermore, the person tracking support device 12 receives the time at which the tracked person is imaged by each camera 14 from the authentication device 16, predicts a time at which the tracked person reaches a specific area in the facility from each time received, and transmits the predicted time to each mobile terminal device 18 via the network 22.

Figure 6:
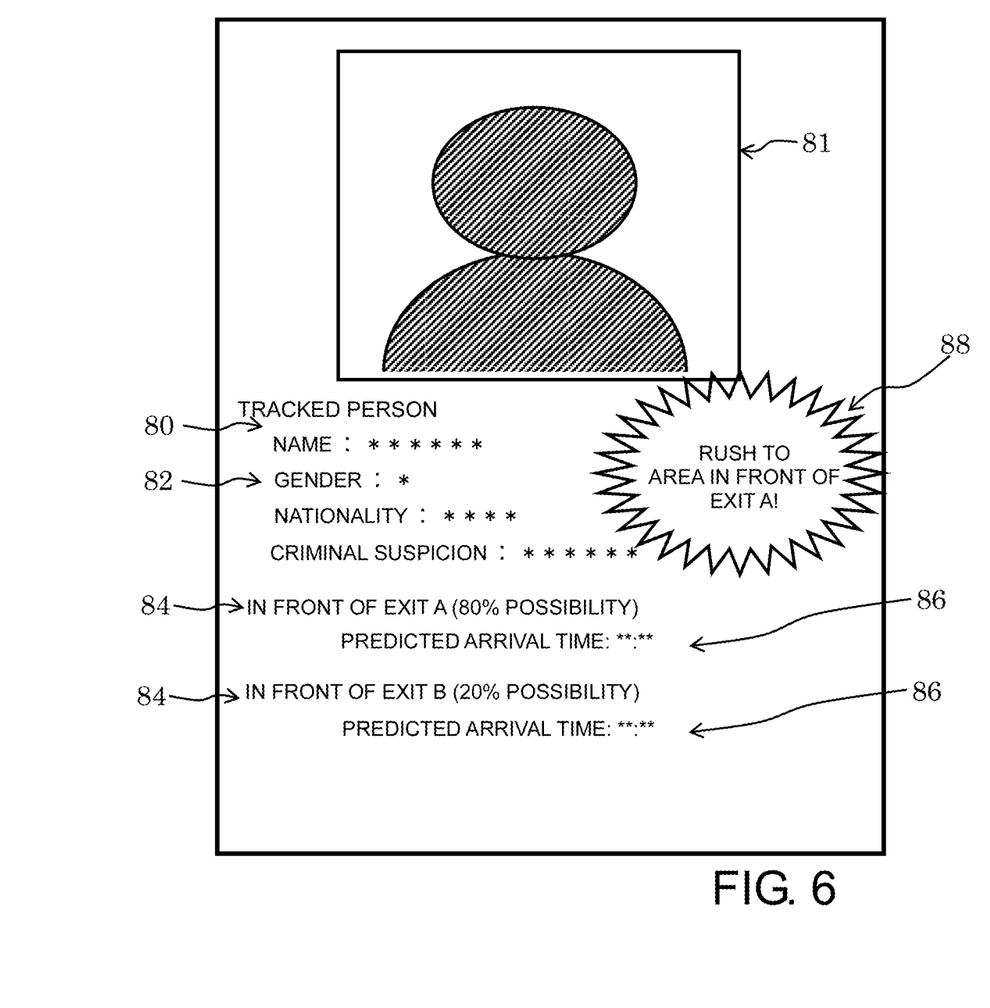
FIG. 6 is a diagram illustrating an example of a display screen of a mobile terminal device.

The mobile terminal device 18 is a smartphone, a tablet terminal, or the like. The mobile terminal device 18 receives the identification information and feature information of the tracked person from the person tracking support device 12, and also receives the time at which the tracked person reaches the specific area in the facility, which is predicted by the person tracking support device 12. Then, the mobile terminal device 18 displays the received identification information and feature information of the tracked person and time at which the tracked person reaches the specific area in the facility on a touch panel or a display (hereinafter, referred to as touch panel or the like) of the mobile terminal device 18. FIG. 6 illustrates an example of a display screen of the mobile terminal device 18.

Figure 7:
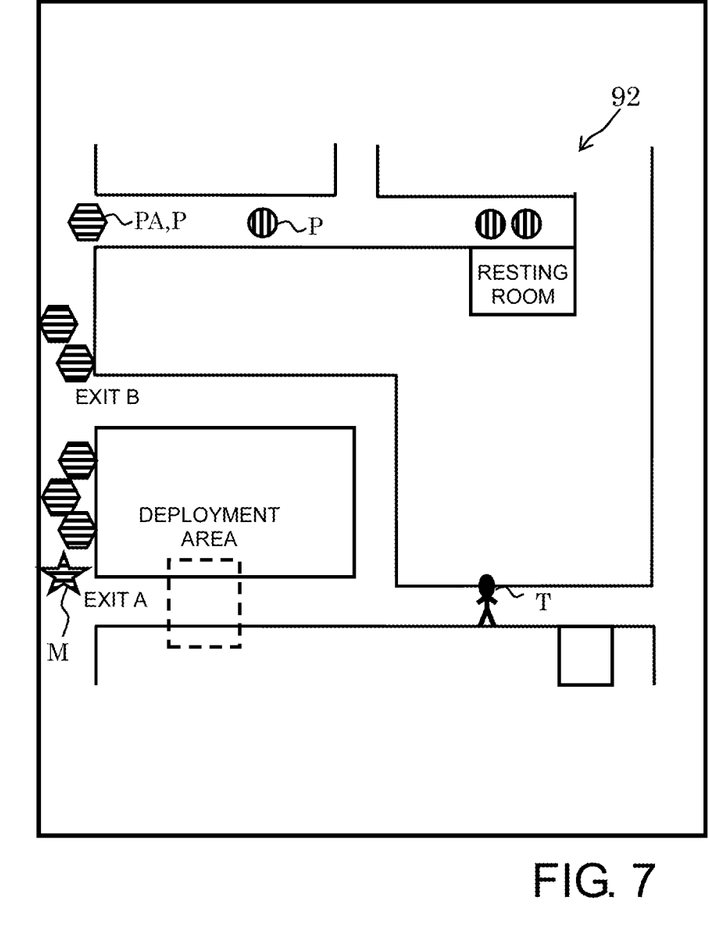
FIG. 7 is a diagram illustrating another example of the display screen of the mobile terminal device.

Furthermore, a map of the facility (airport in the present embodiment) to which the person tracking support system 10 is applied is installed in the mobile terminal device 18. The mobile terminal device 18 acquires position information of the mobile terminal device 18 by using an indoor positioning technology, and displays a screen (hereinafter, referred to as a map screen) in which a position of the mobile terminal device 18 is superimposed on the map of the facility on the touch panel or the like of the mobile terminal device 18. FIG. 7 illustrates an example of a map screen 92, and a star mark indicates a position M of the mobile terminal device 18. Note that, as the indoor positioning technology, for example, a known technology can be used in which the mobile terminal device 18 receives radio waves from a beacon or a Wi-Fi (registered trademark) access point and obtains the position information of the mobile terminal device 18 from the reception strength; however, other positioning technologies may be used.

Figure 2:
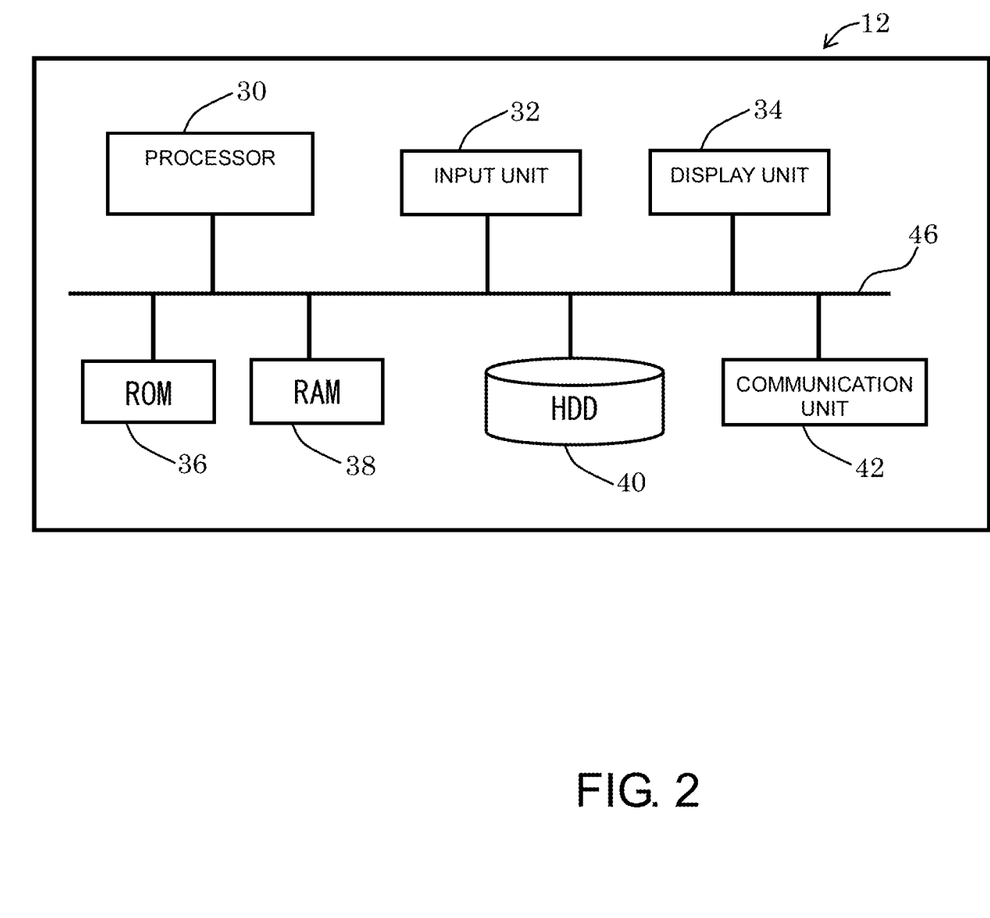
FIG. 2 is a diagram illustrating an example of a hardware configuration of the person tracking support device.

Next, the person tracking support device 12 will be described in detail. FIG. 2 is a diagram illustrating an example of a hardware configuration of the person tracking support device 12. The person tracking support device 12 includes, for example, a processor 30, ROM 36, RAM 38, a hard disk drive (HDD) 40, a communication unit 42 such as a network card, an input unit 32 such as a mouse or keyboard, and a display unit 34 such as a display, and these are connected to a bus 46. Note that, the processor 30 may include one or a plurality of CPUs, and the plurality of CPUs may be positioned to be physically separated from each other.

Figure 3:
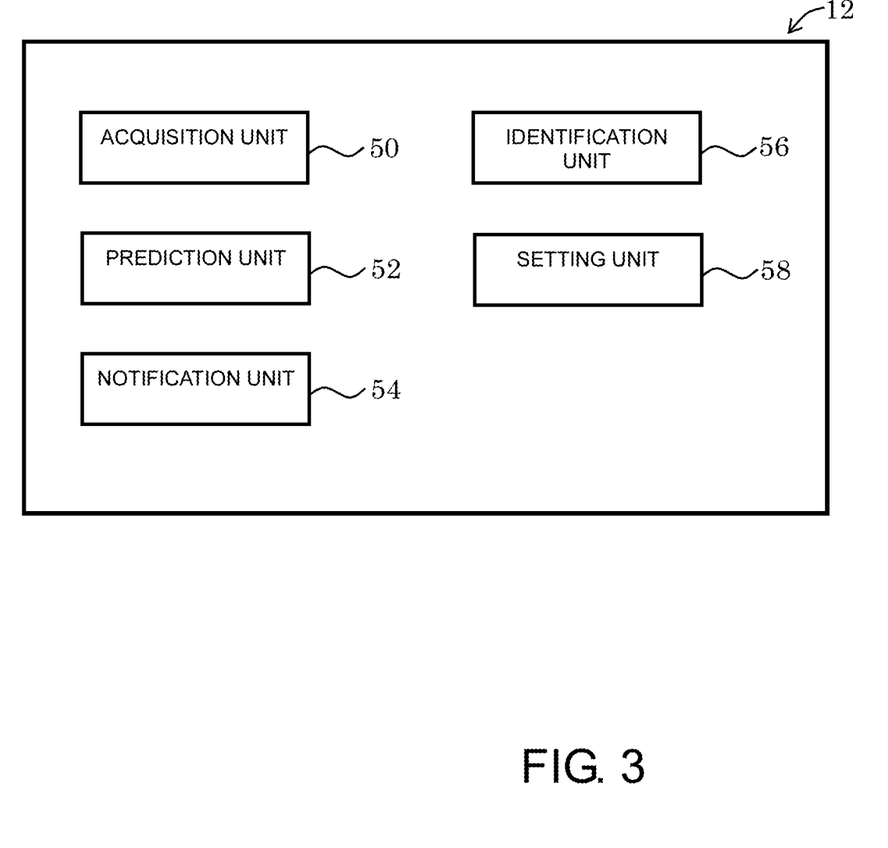
FIG. 3 is a functional block diagram of the person tracking support device.

In the person tracking support device 12, the processor 30 executes a program stored in the HDD 40 or the like, thereby functioning as an acquisition unit 50, a prediction unit 52, a notification unit 54, an identification unit 56, and a setting unit 58 as illustrated in FIG. 3. That is, the functions of each of these units are implemented by the processor 30. The program executed by the processor 30 can be provided not only by communication means but also by being stored in a computer-readable recording medium such as an optical disk or a USB memory.

Figure 4:
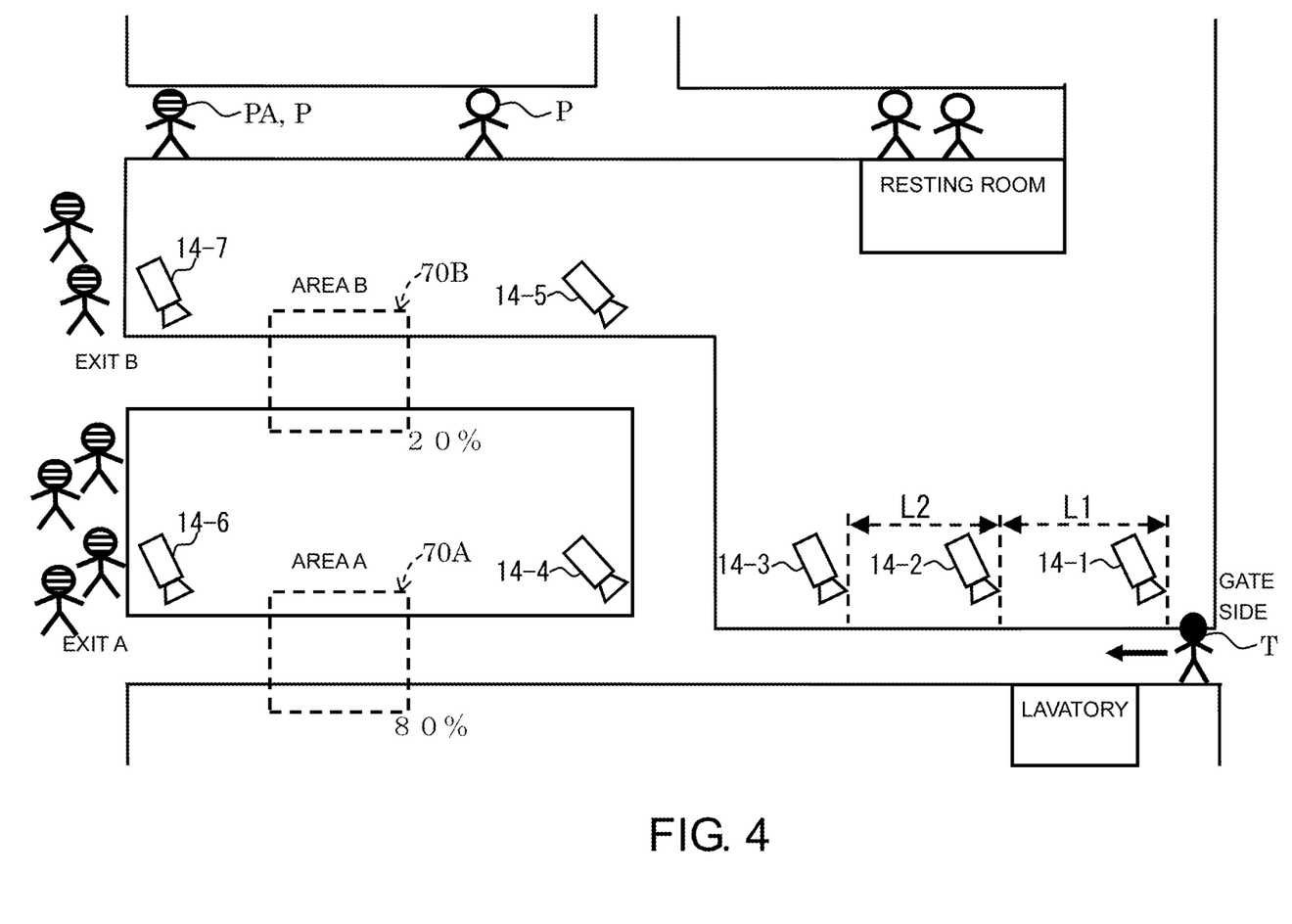
FIG. 4 is a diagram for explaining support for tracking person by a person tracking support device.

Next, the detailed operation of the person tracking support system 10 will be described. FIG. 4 illustrates an example of tracking a tracked person T who appears at an airport by using the person tracking support system 10. The figure illustrates a state in which the tracked person T gets off an airplane and heads for an arrival lobby through a passage in the airport, and the arrival lobby can be reached through an exit A or an exit B. Furthermore, in the figure, person marks with white heads represent observers P, and person marks with hatched heads represent observers (trackers PA) who have received a deployment command described later among the observers P. At the airport, the plurality of cameras 14-1 to 14-7 are installed at intervals.

When a person heads for the exit A or exit B from a gate side, first, the person's face is imaged by the first camera 14-1. The authentication device 16 identifies the tracked person T from a face image of the person appearing in the captured image by the first camera 14-1, and transmits to the person tracking support device 12 identification information and feature information of the identified tracked person T. At this time, the authentication device 16 acquires a first time that is a time at which the tracked person T is imaged by the first camera 14-1, and also transmits it to the person tracking support device 12.

The acquisition unit 50 of the person tracking support device 12 acquires the identification information and feature information of the tracked person T and the first time from the authentication device 16. Then, the notification unit 52 of the person tracking support device 12 transfers the identification information and feature information of the tracked person T to the mobile terminal device 18 of each observer P. Furthermore, the prediction unit 52 of the person tracking support device 12 predicts a time (hereinafter referred to as predicted arrival time) at which the tracked person T reaches a specific area (70A, 70B in FIG. 4) of the facility on the basis of the first time, and the notification unit 54 of the person tracking support device 12 transmits the predicted arrival time to the mobile terminal device 18 of each observer P together with information indicating the specific area.

Note that, the specific area is a predetermined area in the facility through which the tracked person T may pass, and one or more specific areas are provided. In this embodiment, there are two specific areas, and the specific areas 70A and 70B are provided in front of the exits A and B, respectively. Furthermore, in this embodiment, the specific areas 70A and 70B are also areas where the trackers PA are deployed to capture the tracked person T. Hereinafter, in a case where it is not necessary to distinguish each of the specific areas 70A and 70B, it is referred to as a specific area 70.

Here, a distance from the first camera 14-1 to the specific area 70A can be grasped in advance. The prediction unit 52 predicts a required time from the first camera 14-1 to the specific area 70A by dividing the distance from the first camera 14-1 to the specific area 70A by a representative value (for example, an average value) of a person's general walking speed, and adds it to the first time, to predict a time (predicted arrival time) at which the tracked person T reaches the specific area 70A. For the specific area 70B, a predicted arrival time is predicted similarly.

The mobile terminal device 18 of each observer P receives the identification information and feature information of the tracked person T, the information indicating the specific area, and the predicted arrival time from the person tracking support device 12. Then, as illustrated in FIG. 6, the mobile terminal device 18 of each observer P displays, on the touch panel or the like of the mobile terminal device 18, identification information 80 (name and face image 81 in FIG. 6) and feature information (gender, nationality, and criminal suspicion in FIG. 6) of the tracked person T, information 84 indicating the specific area, and a predicted arrival time 86.

Furthermore, at this time, the mobile terminal device 18 causes the observer P to perceive that the tracked person T has appeared, by alarm or vibration. Note that, a deployment command message 88 illustrated in FIG. 6 does not appear on the mobile terminal devices 18 of all the observers P, but appears only on the mobile terminal devices 18 possessed by persons set as the trackers PA from among the observers P as described below.

When the tracked person T is identified from the captured image by the first camera 14-1, the person tracking support device 12 further sets the trackers PA for tracking the tracked person T, and issues a command for deployment in the specific area 70 to the mobile terminal devices 18 of the trackers PA. Specifically, this is performed as follows.

Figure 5:
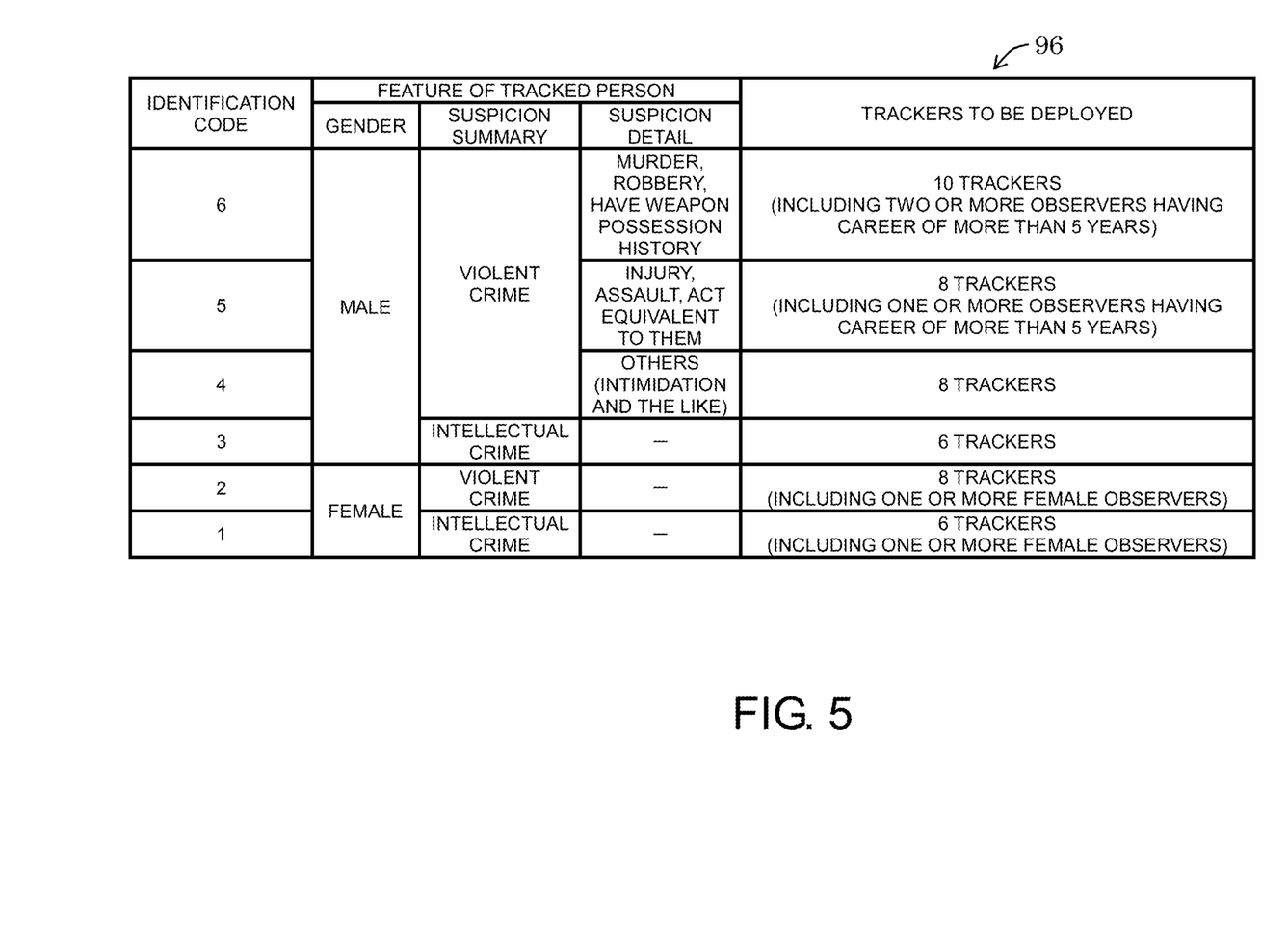
FIG. 5 is a diagram for explaining a setting of a tracker depending on a feature of a tracked person.

The person tracking support device 12 stores in advance in the HDD 40 or the like a table 96 in which features of the tracked person and the number and features of the trackers to be deployed are associated with each other as illustrated in FIG. 5. The setting unit 58 of the person tracking support device 12 sets the trackers PA corresponding to the features of the tracked person T by collating the feature information of the tracked person T from the authentication device 16 with the table 96. Here, the trackers PA set by using the table 96 in FIG. 5 have the following features.

When a type of suspicion of the tracked person T is violent crime, the number of the trackers PA deployed in the specific area 70 is increased as compared with the case of intellectual crime. Furthermore, if the tracked person T is a violent criminal, in a case where the type of suspicion is murder or robbery, the number of the trackers PA deployed in the specific area 70 is increased as compared with the case of other types of suspicion. Furthermore, in a case where the tracked person T has a weapon possession history, the number of the trackers PA deployed in the specific area 70 is increased as compared with a case where the tracked person T does not have a weapon possession history. In this way, it is possible to predict resistance of the tracked person T to the trackers PA and suppress insufficient or excessive deployment of the trackers PA.

Furthermore, in a case where the type of suspicion of the tracked person T is the violent crime, a greater number of the observers P having a specific career are set as the trackers PA as compared with the case of the intellectual crime. The observer P having a specific career is, for example, an observer who has more than a predetermined number of years of experience as a security guard or police officer (five years or more in FIG. 5). Furthermore, the observer P who has a specific career may be, for example, a person who has more than a predetermined number of times of experience of capturing a suspect in the past, or a person whose level of martial arts such as judo or karate is a predetermined level or higher. In this way, in a case where the tracked person T is a violent criminal, the trackers PA suitable for that can be deployed, and failure to capture the tracked person T can be suppressed.

Furthermore, in a case where the tracked person T is a female, at least one female observer P is set as the tracker PA. In this way, the female tracked person T can be smoothly captured. The above descriptions are the features of the trackers PA set on the basis of the table 96 in FIG. 5.

Next, the acquisition unit 50 of the person tracking support device 12 acquires position information of the mobile terminal device 18 as position information of the observer P from each mobile terminal device 18. Furthermore, the acquisition unit 50 of the person tracking support device 12 acquires, from each mobile terminal device 18, feature information (gender, presence or absence of a specific career, and the like) of the observer P who possesses the mobile terminal device 18, which is stored in advance in the mobile terminal device 18.

Then, the setting unit 58 of the person tracking support device 12 assigns the trackers PA in order from the observer P who is near the specific area 70 by the number of the trackers PA obtained in the table 96. At this time, in a case where it is necessary to set a female or a person having a specific career as the tracker PA, a female or a person having a specific career who is closer to the specific area 70 is first assigned as the tracker PA, and then a remaining number of the observers P who are near the specific area 70 are assigned as the trackers PA.

Here, as illustrated in FIG. 4, in a case where there are two or more areas to which the tracked person T may advance due to branching of the passage of the facility and two or more specific areas 70 are correspondingly provided (two areas of the specific areas 70A and 70B in FIG. 4), the setting unit 58 of the person tracking support device 12 sets the trackers PA for each of the specific areas 70A and 70B. Specifically, this is performed as follows.

First, the identification unit 56 of the person tracking support device 12 identifies a predicted ratio at which the tracked person T advances to each of the specific areas 70A and 70B, on the basis of information on a current or past flow of people to each of the specific areas 70A and 70B. For example, the identification unit 56 detects a relative ratio of an amount of people heading for each of the specific areas 70A and 70B from a current or past captured image of the camera 14 provided in the middle of the passage toward each of the specific areas 70A and 70B, and sets it as the predicted ratio of each of the specific areas 70A and 70B (for example, if the amount of people heading for the specific area 70A:the amount of people heading for the specific area 70B=8:2, the predicted ratio of the specific area 70A=80%, and the predicted ratio of the specific area 70B=20% are set). Furthermore, for example, in a case where it is detected from the current captured image of the camera 14 provided in the middle of the passage toward each of the specific areas 70A and 70B that one of the passages is blocked or difficult to pass through due to cleaning or construction, the identification unit 56 may set the predicted ratio of the specific area ahead of that passage to 0% or close to it. Furthermore, for example, in a case where the relative ratio of people heading for each of the specific areas 70A and 70B changes depending on a season (each month, busy season, off-season, or the like) and a period of time in one day, the identification unit 56 may predict a relative ratio of the amount of people heading for each of the current specific areas 70A and 70B from accumulated information (past statistical information) of the amount of people in each of the specific areas 70A and 70B with respect to the season and the period of time in one day, and set the ratio as the predicted ratio of each of the specific areas 70A and 70B.

Next, the setting unit 58 of the person tracking support device 12 distributes the number of the trackers PA obtained in the table 96 in FIG. 5 depending on the identified predicted ratio. For example, in a case where the number of the trackers PA is obtained as 10 from the table 96 in FIG. 5, and the predicted ratio of the specific area 70A is 80% and the predicted ratio of the specific area 70B is 20%, 8 trackers PA are set for the specific area 70A, and 2 trackers PA are set for the specific area 70B. Furthermore, at this time, similarly to the above, the tracker PA is assigned in order from the observer P who is near each of the specific areas 70A and 70B. In this way, an appropriate number of the trackers PA can be deployed in each of the plurality of specific areas 70 to which the tracked person T may advance. Furthermore, it is possible to increase the deployment in the specific area to which the tracked person T is highly likely to advance, and it is possible to reduce a possibility of losing sight of the tracked person T.

Then, the notification unit 54 of the person tracking support device 12 notifies the mobile terminal device 18 of the observer P set as the tracker PA of information indicating the specific area as a deployment destination and a deployment command to the specific area. As a result, as illustrated in the deployment command message 88 in FIG. 6, the mobile terminal device 18 of the tracker PA displays the deployment command including the specific area as the deployment destination ("in front of exit A" in FIG. 6). Note that, the notification unit 54 of the person tracking support device 12 may notify the mobile terminal device 18 of the observer P of the above-described predicted ratios of the specific areas 70A and 70B, and the mobile terminal device 18 of the observer P may display the predicted ratios on the touch panel or the like (display of "80% possibility" and "20% possibility" in FIG. 6).

In accordance with the deployment command message 88, the tracker PA rushes to the specific area indicated in the command received. As illustrated in FIG. 7, the mobile terminal device 18 of the observer P can display the map screen 92 in which the position M of the mobile terminal device 18 is superimposed on the map of the facility. The mobile terminal device 18 can also display positions of the other observers P on the map screen 92 by obtaining position information of the other mobile terminal devices 18 from the person tracking support device 12. Furthermore, the mobile terminal device 18 also obtains information indicating whether possessors of the other mobile terminal devices 18 are the trackers PA or the observers P who are not the tracker PA, thereby being able to display the positions of the observers P so that the trackers PA and the observers P who are not the trackers PA are distinguished from each other. In the map screen 92 of FIG. 7, the shape and hatching of marks indicating the positions of the other observers P are changed depending on difference between the trackers PA and the observers P who are not the tracker PA. Note that, the shape, color, hatching, or the like of the mark indicating the position M of the mobile terminal device 18 on the map screen 92 may be changed depending on whether a possessor oneself of the mobile terminal device 18 is the tracker PA or the observer P who is not the tracker PA. Furthermore, in a case where the possessor oneself of the mobile terminal device 18 is the tracker PA, the map screen 92 of FIG. 7 can also display a position of the specific area indicated in the deployment command received (the dashed square in FIG. 7). By confirming such a map screen 92, the tracker PA can accurately head for the specific area while confirming the positions of other trackers PA.

Referring back to FIG. 4, the explanation is continued. When the tracked person T advances from the first camera 14-1 to the second camera 14-2, the tracked person T is imaged by the second camera 14-2. The authentication device 16 identifies the tracked person T from a face image of a captured image by the second camera 14-2, and transmits identification information of the identified tracked person T to the person tracking support device 12. At this time, the authentication device 16 acquires a second time that is a time at which the tracked person T is imaged by the second camera 14-2, and also transmits it to the person tracking support device 12.

The acquisition unit 50 of the person tracking support device 12 acquires the identification information of the tracked person T and the second time from the authentication device 16. Then, when the person tracking support device 12 confirms that the acquired identification information of the tracked person T is the same as the identification information of the tracked person T acquired last time, the prediction unit 52 of the person tracking support device 12 calculates a moving speed of the tracked person T from an elapsed time from the first time to the second time and a distance L1 from the first camera 14-1 to the second camera 14-2.

Then, the prediction unit 52 predicts a required time from the second camera 14-2 to the specific area 70A by dividing a distance from the second camera 14-2 to the specific area 70A by the calculated moving speed, and adds it to the second time, to predict again the time at which the tracked person T reaches the specific area 70A (predicted arrival time). The same applies to the specific area 70B. Then, the notification unit 54 of the person tracking support device 12 transmits the predicted arrival time for each of the specific areas 70A and 70B to the mobile terminal device 18 of each observer P together with information indicating each of the specific areas 70A and 70B.

The mobile terminal device 18 of each observer P receives the predicted arrival time for each of the specific areas 70A and 70B from the person tracking support device 12, and updates the predicted arrival time 86 for each of the specific areas 70A and 70B displayed on the touch panel or the like of the mobile terminal device 18 to the received predicted arrival time. In this way, the observer P can grasp the more accurate predicted arrival time of the tracked person T to each of the specific areas 70A and 70B based on the actual moving speed of the tracked person T. Thus, the tracker PA can perform an action of arriving at the specific area 70A or 70B before the arrival time of the tracked person T, and can suppress losing sight of the tracked person.

Next, when the tracked person T advances from the second camera 14-2 to the third camera 14-3, the tracked person T is imaged by the third camera 14-3. The authentication device 16 identifies the tracked person T from a face image of a captured image by the third camera 14-3, and transmits identification information of the identified tracked person T to the person tracking support device 12. At this time, the authentication device 16 acquires a third time that is a time at which the tracked person T is imaged by the third camera 14-3, and also transmits it to the person tracking support device 12.

The acquisition unit 50 of the person tracking support device 12 acquires the identification information of the tracked person T and the third time from the authentication device 16. Then, when the person tracking support device 12 confirms that the acquired identification information of the tracked person T is the same as the identification information of the tracked person T acquired last time, the prediction unit 52 of the person tracking support device 12 calculates a moving speed of the tracked person T from an elapsed time from the second time to the third time and a distance L2 from the second camera 14-2 to the third camera 14-3.

Then, the prediction unit 52 predicts a required time from the third camera 14-3 to the specific area 70A by dividing a distance from the third camera 14-3 to the specific area 70A by the calculated moving speed, and adds it to the third time, to predict again the time at which the tracked person T reaches the specific area 70A (predicted arrival time). The same applies to the specific area 70B. Then, the notification unit 54 of the person tracking support device 12 transmits the predicted arrival time for each of the specific areas 70A and 70B to the mobile terminal device 18 of each observer P together with information indicating each of the specific areas 70A and 70B.

The mobile terminal device 18 of each observer P receives the predicted arrival time for each of the specific areas 70A and 70B from the person tracking support device 12, and updates the predicted arrival time 86 for each of the specific areas 70A and 70B displayed on the touch panel or the like of the mobile terminal device 18 to the received predicted arrival time.

As described above, each time the tracked person T is imaged by the camera 14, the predicted arrival time is updated of the tracked person T for each of the specific areas 70A and 70B. In this way, the accuracy of the predicted arrival time can be improved even in a case where the moving speed of the tracked person T changes. For example, when the tracked person T stops between the first camera 14-1 and the second camera 14-2, or makes a detour to a lavatory, a shop, or the like, the elapsed time between the first time and the second time becomes longer, and the predicted arrival time obtained from it can be excessively delayed. On the other hand, when the tracked person T rides on a horizontal or staircase escalator and the like between the first camera 14-1 and the second camera 14-2, the elapsed time between the first time and the second time becomes shorter, and the predicted arrival time obtained from it can be too early. However, as described above, if the moving speed of the tracked person T is updated each time the tracked person T is imaged by each camera 14 on the way to the exits A and B, the predicted arrival time of the tracked person T becomes more accurate for each of the specific areas 70A and 70B.

Note that, the person tracking support device 12 may calculate an average value (hereinafter referred to as an average moving speed) by using the moving speed of the tracked person T obtained each time the tracked person T is imaged by the camera 14, predict a required time for the tracked person T to reach the specific area 70 from the camera 14 by which the tracked person T is most recently imaged, by dividing a distance from the camera 14 by which the tracked person T is most recently imaged to the specific area 70 by the average moving speed, and update the predicted arrival time for the specific area 70. Furthermore, at this time, the excessive or too low moving speed may be excluded by a threshold value, and then the average moving speed may be calculated.

Note that, since the information on the time (first time, second time ••) at which the tracked person T is imaged by each camera 14 described above includes the information on an identifier of each camera 14 such as a first, a second ••, the person tracking support device 12 can obtain information indicating which camera 14 position the tracked person T has passed through at present by obtaining the time at which the tracked person T is imaged by the camera 14 from the authentication device 16. Then, the person tracking support device 12 transmits the information to the mobile terminal device 18 of each observer P, whereby the mobile terminal device 18 can superimpose and display a position of the tracked person T on the map screen 92 of FIG. 7. At this time, the person tracking support device 12 may predict a current position of the tracked person T from the information indicating which camera 14 position the tracked person T has passed through at present and the above-described moving speed or average moving speed of the tracked person T, and transmit the predicted position information to the mobile terminal device 18 of each observer P. In this way, the mobile terminal device 18 can display a more accurate position of the tracked person T on the map screen 92 of FIG. 7.

With the information provided from the mobile terminal device 18, the tracker PA can perform action of arriving at the specific area 70A or 70B before the tracked person T reaches there, and losing sight of the tracked person T is suppressed and it becomes easier to capture the tracked person T.

Note that, in the embodiment described above, the person tracking support device 12 sets the trackers PA from among the observers P and issues the deployment command to the trackers PA. However, an embodiment may be adopted in which the person tracking support device 12 does not set the trackers PA, and does not issue the deployment command. Even in this case, the observer P can appropriately head for the specific area 70 on the basis of information provided from the mobile terminal device 18.

The invention claimed is:
1. A person tracking support device comprising a processor, wherein
the processor
acquires identification information of a tracked person identified from a face image of a person imaged by a first camera, and a first time at which the tracked person is imaged by the first camera, and also acquires a second time at which the tracked person is imaged by a second camera positioned away from the first camera,
predicts a time at which the tracked person reaches a specific area on a route positioned on the second camera's side with respect to the first camera on a basis of an elapsed time from the first time to the second time and a distance from the first camera to the second camera, and notifies a mobile terminal device possessed by each of a plurality of observers of the identification information of the tracked person, the specific area, and the time predicted.

2. The person tracking support device according to claim 1, wherein
the processor
further acquires a third time at which the tracked person is imaged by a third camera positioned between the second camera and the specific area,
updates the time predicted on a basis of an elapsed time from the second time to the third time and a distance from the second camera to the third camera, and
notifies the mobile terminal device of the time updated.

3. The person tracking support device according to claim 1, wherein
there are two or more of the specific areas, and
the processor
identifies a predicted ratio at which the tracked person advances to each of the plurality of specific areas on a basis of information on a current or past flow of people to each of the specific areas,
sets a tracker to be deployed in each of the plurality of specific areas from among the observers on a basis of the predicted ratio, and
notifies the mobile terminal device of each tracker of a deployment command to the specific area set for each tracker.

4. The person tracking support device according to claim 3, wherein
the processor
sets the tracker such that the number of the trackers deployed in another specific area having a higher predicted ratio than a certain predicted ratio is greater than that of the specific area in which the predicted ratio is the certain predicted ratio.

5. The person tracking support device according to claim 4, wherein
the processor
acquires a type of suspicion of the tracked person, and in a case where the tracked person is identified as a violent criminal from the type of suspicion, sets the tracker such that the number of the trackers deployed in at least one of the specific area or the other specific area is greater than that in a case where the tracked person is identified as an intellectual criminal from the type of suspicion.

6. The person tracking support device according to claim 1, wherein
the processor
acquires feature information of the tracked person, and sets a tracker to be deployed in the specific area from among the observers on a basis of the feature information, and
notifies the mobile terminal device of the tracker of a deployment command to the specific area.

7. The person tracking support device according to claim 6, wherein
the feature information includes a type of suspicion of the tracked person, and
the processor,
in a case where the tracked person is identified as a violent criminal from the type of suspicion, sets the tracker such that the number of the trackers to be deployed in the specific area is greater than that in a case where the tracked person is identified as an intellectual criminal from the type of suspicion.

8. The person tracking support device according to claim 6, wherein
the feature information includes a type of suspicion of the tracked person, and
the processor,
in a case where the tracked person is identified as a violent criminal from the type of suspicion, sets the tracker such that a greater number of the observers having a specific career are deployed in the specific area than that in a case where the tracked person is identified as an intellectual criminal from the type of suspicion.

9. A person tracking support system comprising:
an authentication device that identifies a tracked person from a face image of a person imaged by a first camera and acquires identification information of the tracked person and a first time at which the tracked person is imaged by the first camera, and also identifies the tracked person from a face image of a person imaged by a second camera positioned away from the first camera and acquires a second time at which the tracked person is imaged by the second camera;
a person tracking support device that acquires the identification information of the tracked person, the first time, and the second time from the authentication device; and
a mobile terminal device communicably connected to the person tracking support device and possessed by each of a plurality of observers, wherein
the person tracking support device includes a processor, and
the processor
predicts a time at which the tracked person reaches a specific area on a route positioned on the second camera's side with respect to the first camera on a basis of an elapsed time from the first time to the second time and a distance from the first camera to the second camera, and
notifies each mobile terminal device of the identification information of the tracked person, the specific area, and the time predicted.

* * * * *